United States Patent [19]

Bernecker et al.

[11] Patent Number: 5,547,269

[45] Date of Patent: Aug. 20, 1996

[54] SWITCH AND DISPLAY PANEL FOR ELECTRICAL MONITORING AND CONTROL SYSTEMS

[76] Inventors: Erwin Bernecker, Mitterndorf 70, A-5122 Ach; Josef Rainer, Holzöster 16, A-5131 Franking, both of Austria

[21] Appl. No.: 162,165

[22] PCT Filed: Jun. 10, 1992

[86] PCT No.: PCT/AT92/00075

§ 371 Date: Dec. 10, 1993

§ 102(e) Date: Dec. 10, 1993

[87] PCT Pub. No.: WO92/22948

PCT Pub. Date: Dec. 23, 1992

[30] Foreign Application Priority Data

Jun. 11, 1991 [AT] Austria .................................. 1171/91

[51] Int. Cl.[6] .................................................. F16B 12/00
[52] U.S. Cl. ............................................ 312/111; 312/107
[58] Field of Search ..................................... 312/111, 107

[56] References Cited

FOREIGN PATENT DOCUMENTS

| 0040409 | 11/1981 | European Pat. Off. . |
|---|---|---|
| 0047193 | 3/1982 | European Pat. Off. . |
| 0385966 | 9/1990 | European Pat. Off. . |
| 1600001 | 8/1970 | France . |
| 1600001 | 8/1970 | France . |
| 876858 | 5/1953 | Germany . |
| 1490576 | 6/1969 | Germany . |
| 2110318 | 9/1972 | Germany . |
| 2260325 | 6/1974 | Germany . |
| 2452173 | 5/1976 | Germany . |
| 3011903 | 10/1981 | Germany . |

*Primary Examiner*—Peter M. Cuomo
*Assistant Examiner*—Gerald A. Anderson
*Attorney, Agent, or Firm*—Collard & Roe, P.C.

[57] ABSTRACT

A switchboard or a display board for an electric monitoring and control system is comprised of at least two modular elements, the modular elements having visible sides of the same regular contour or of a multiple of said regular contour, the visible sides of the modular elements abutting each other to form a continuous pattern constituting a visible side of the switchboard or display board. Each modular element comprises a surface element forming the visible side and side walls projecting backwards from the surface element, the surface element having edge portions projecting outwards of the side wall and forming a peripheral region, the edge portions having outer edges with mating tongue and groove profiles whereby abutting surface elements of the modular elements may be plugged together while leaving gaps between adjacent ones of the side walls below the projecting edge portions, and the side walls being formed with undercut locking grooves. Connecting elements are inserted in the gaps between the adjacent side walls and have detent projections engaging the locking grooves.

9 Claims, 4 Drawing Sheets

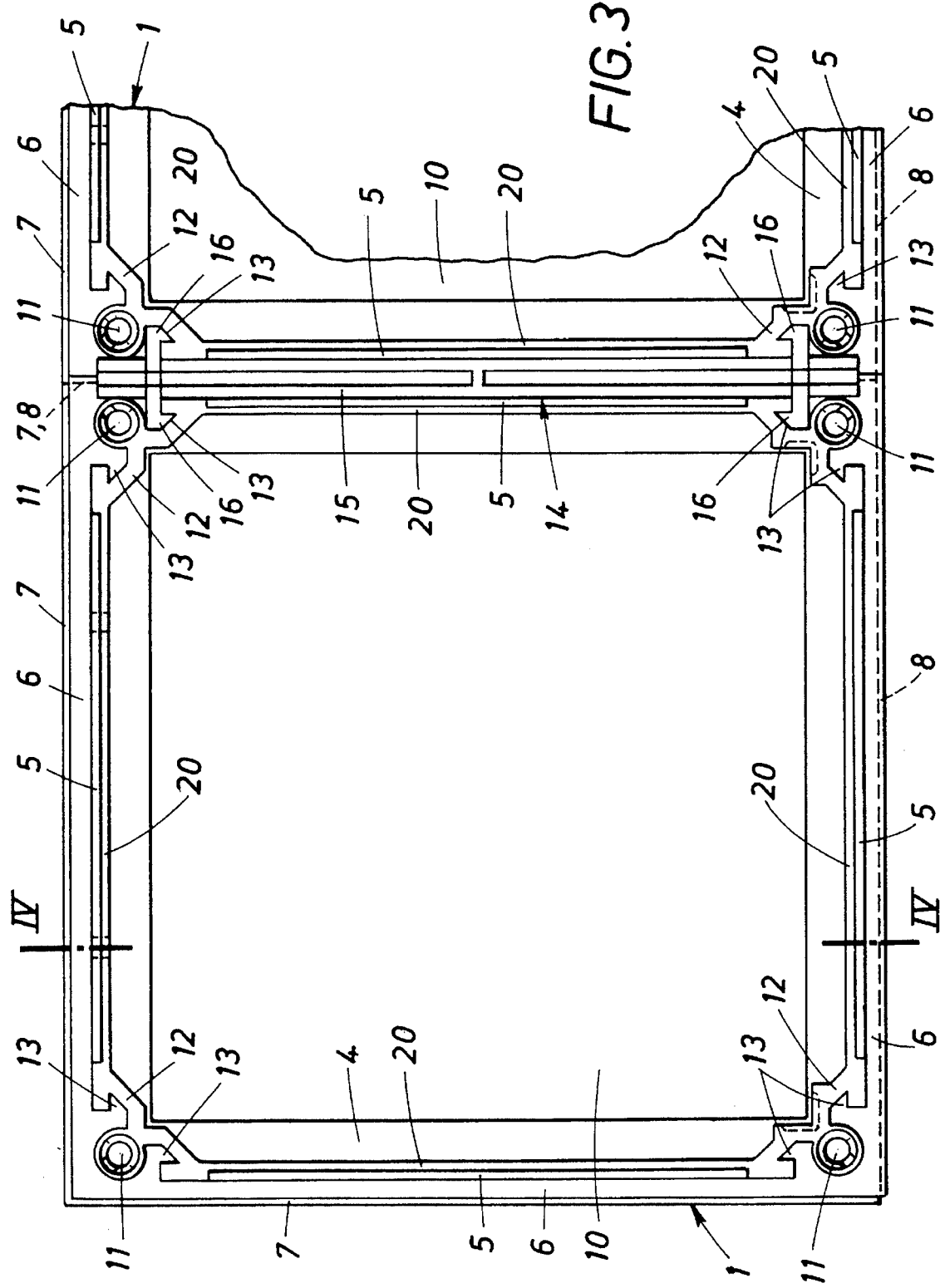

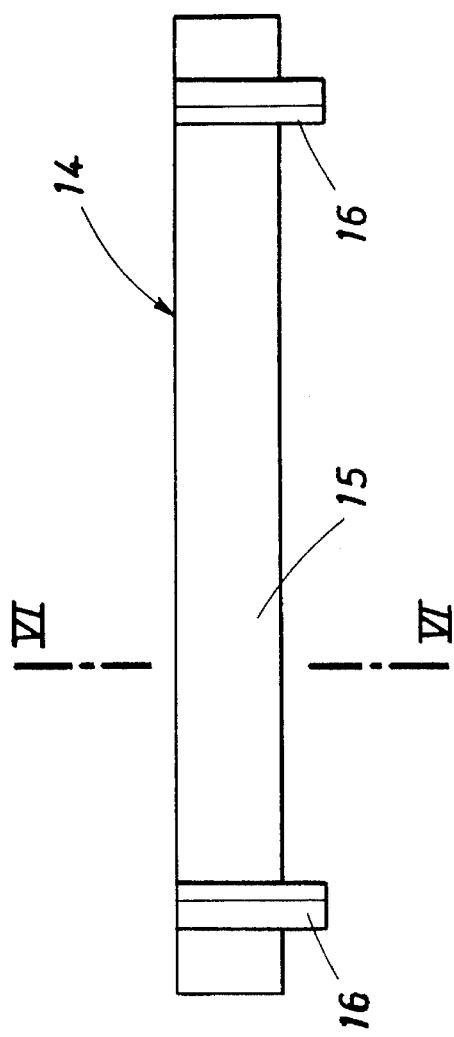
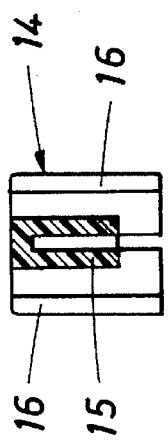
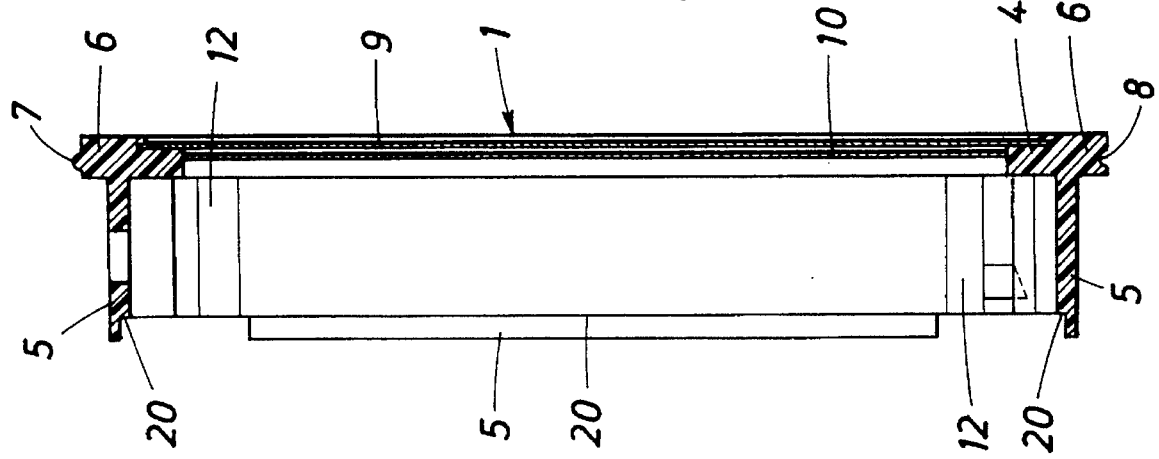

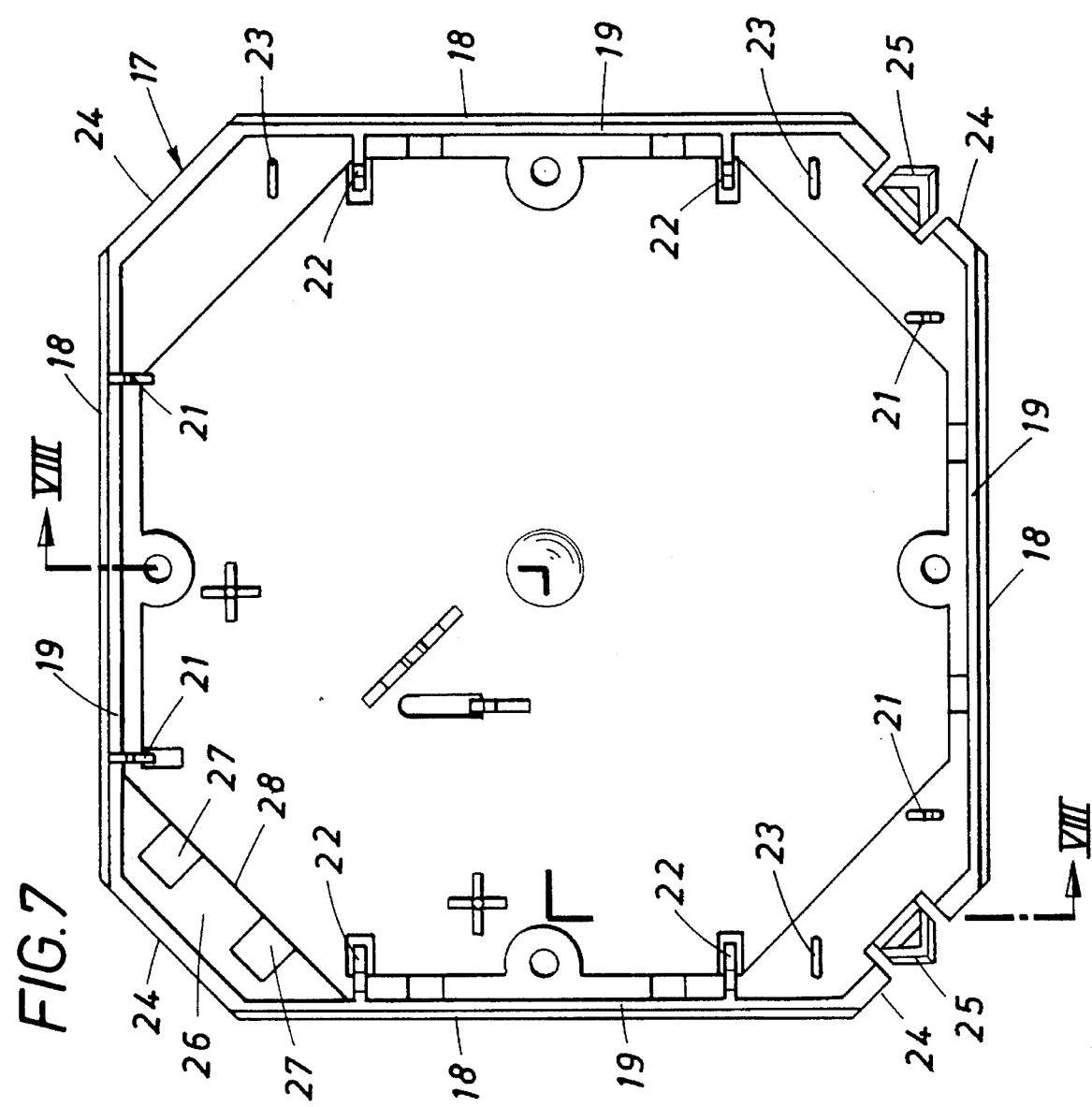

SWITCH AND DISPLAY PANEL FOR ELECTRICAL MONITORING AND CONTROL SYSTEMS

BACKGROUND OF THE INVENTION

1. Field of the Invention

This invention relates to a switchboard or display board for electrical monitoring and control systems, comprising two or more sub-assemblies distributed over the board and each of which comprises a display or control device, or the like, visible on a visible side of the board, particularly switching keys and keyboards.

2. Description of the Prior Art

In the previous practice, such boards comprise a body, which in most cases consists of a sheet metal carrier plate in a carrying frame, and the sheet metal plate is formed with window openings for each display field and for switching and setting means, which are operable from the visible side of the board, whereas additional sub-assemblies, which need not be directly accessible from the visible side, are mounted in covered regions. It is also known to use a larger panel composed of a plurality of fields, which extend over the width of the panel and are held in the frame and each of which receives one or more sub-assemblies and is provided with the necessary apertures and windows. It is finally also known to mount display screens and display means with associated switching and setting means, particularly switching keys and keyboards, on plates which have corresponding display and/or actuating openings and to insert these plates into corresponding apertures of the panel unless the size of the plate and panel incidentally correspond to each other in at least one dimension. Besides, it is often necessary to mount keyboards, switches and actuating means which are associated with existing display means or display screens in a manner prescribed or desired by the customer for functional or aesthetic reasons, and it may be necessary in each such case to provide identical elements in different groupings and with different labels and/or designations. For all these reasons, the manufacture and assembling of switch and display boards of the kind mentioned first hereinbefore and the manufacture of display devices and display screens with associated switching and control means in a certain arrangement has previously constituted a considerable problem and the space existing on a switch or display board cannot efficiently be utilized and all boards which are not absolutely identical must be individually manufactured from separate elements and with separate apertures at least as far as the visible side of the panels is concerned. An extension or alteration of the arrangement of the sub-assemblies will often be possible only if the panel is entirely disassembled and a new front plate with corresponding apertures is employed.

SUMMARY OF THE INVENTION

It is an object of the invention to provide a switch or display board which is of the kind described first hereinbefore and in which the disadvantages and difficulties which have been outlined are eliminated and which provides a large latitude regarding the design and arrangement of the sub-assemblies, even in case of extensions or alterations, as well as a manufacture of different boards from identical or similar basic elements so that switch and display boards for various purposes may consist of elements having a few basic shapes.

The object set forth is accomplished with a switchboard or a display board for an electric monitoring and control system is comprised of at least two modular elements, the modular elements having visible sides of the same regular contour or of a multiple of said regular contour, the visible sides of the modular elements abutting each other to form a continuous pattern constituting a visible side of the switchboard or display board. Each modular element comprises a surface element forming the visible side and side walls projecting backwards from the surface element, the surface element having edge portions projecting outwards of the side wall and forming a peripheral region, the edge portions having outer edges with mating tongue and groove profiles whereby abutting surface elements of the modular elements may be plugged together while leaving gaps between adjacent ones of the side walls below the projecting edge portions, and the side walls being formed with undercut locking grooves. Connecting elements are inserted in the gaps between the adjacent side walls and have detent projections engaging the locking grooves.

With the design in accordance with the invention, it is possible to provide the individual sub-assemblies in any desired juxtaposed and superimposed arrangement within the pattern which is determined by the basic shape of the modular elements and thus to provide the sub-assemblies in the associations which are desired in each case. Different associations may be adopted to achieve a desired overall appearance and to occupy a certain area or space. Any empty fields in the board may subsequently be replaced as desired by fields which accommodate supplementary sub-assemblies or by fields which are associated with such sub-assemblies, as desired. In a normal case, the board will be composed of closed modular elements, which may receive such devices as computing units, etc., which are associated with the board, or may consists of modular elements having windows or window openings and serving to receive display devices, display screens, etc., or of elements which have actuating apertures or actuating capabilities for switching and setting means on the visible side.

According to a preferred feature, the connecting elements are provided on the rear side of the protruding edge portions of the surface elements of the modular elements so that the outer edges may abut on the visible side virtually without gaps and the board can be assembled when the modular elements have been laid on a locating plate so that a flat panel is obtained.

The surface elements of the modular elements have the same regular contour or a multiple thereof. They may be equilateral triangles or polygons, particularly hexagons. In the latter case, the visible side will have the overall appearance of a honeycomb. But a rectangular contour will be adopted for most applications and it will be particularly preferred to use modular elements having visible sides which are constituted by squares arranged in a row.

In a preferred embodiment, the connecting elements have a length which corresponds to the length of the gaps between the side walls so that corresponding sides of surface elements whose length is a multiple of the lengths of the surface elements can be connected to a corresponding number of such surface elements.

According to a desirable further feature, the side walls, which on the rear side protrude from a surface element which constitutes the visible side, are spaced from and parallel to the outer edges of the surface element. The connecting elements permit the modular elements to be connected in such a manner that the individual elements support each other also by means of the connecting elements so that these contribute to the overall strength of the board. In case of need, the connecting elements also permit a removal of individual modular elements from the rear side of the board.

The connecting elements may consist of insert members which extend substantially continuously along the sides of the modular elements and are insertable into the gap between the side walls of adjacent modular elements. The connecting elements are adapted to be inserted into the gap transversely to their longitudinal direction and are integrally formed with the detent projections which engage the undercut locking recesses in side walls which face the gap so that the modular elements are held together.

The detent projections are desirably hook-shaped in cross-section.

In a design which is particularly favorable for the assembling and disassembling and for a sufficient stability and a gapless joining of the modular elements, the connecting elements are substantially U-shaped spring elements and are adapted to be inserted into the gap transversely to the longitudinal direction of the spring elements in such a manner that the profiled opening which is defined by the longitudinal legs of the U-shaped elements is on its leading side, and these legs are biased toward each other and carry the detent projections.

In accordance with a further feature, the hook-shaped detent projections at the ends of the connecting elements are provided with hook arms, which face away from the ends and which preferably taper to a point. This will ensure a reliable connection of the elements and will ensure that in cause of need the locking recesses can be provided in re-entrant deformed portions of the side walls near the corners of the contour of the surface elements of the modular elements at locations at which they virtually cannot adversely affect the installation of the sub-assembly which is associated with the modular elements.

The bodies of the modular elements and the connecting elements desirably consist of plastic moldings. In that case, the bodies with the receiving recesses and the other female and male deformed portions and integrally formed parts and the connecting elements can economically be made with very small manufacturing tolerances so that the unproblematic assembling will be promoted.

In a particularly desirable embodiment of the invention, the body of the modular element consists of a visible side and side walls and constitutes a shell member, which is open to the rear side of the board and to which another shell member is adapted to be attached to provide a housing for the associated sub-assembly.

In that case, it will be possible in case of need to encapsulate the sub-assembly in the housing and to integrate the sub-assembly in that encapsulated form in the board. Because the shell members can be separated, the elements of the sub-assembly remain nevertheless accessible in the housing and can be serviced or rearranged or supplemented in case of need. The housing may already be attached in the manufacturer's premises and in that case may replace or supplement a package for the sub-assembly. In case of sub-assemblies having different overall heights measured transversely to the visible side, it will nevertheless be desirable to provide shell members of equal height or depth as bodies on the visible side and use supplemental shell members which differ in height. The shell members may additionally be provided on a carrying frame, which is mounted behind the visible side. To support the subassemblies, the shell members are desirably adapted to be joined by means of detent and counterdetent elements which are formed at or in their edge portions.

For a quick assembling and reliable retention of the sub-assemblies, at least one of the two shell members may be provided with integrally formed retaining webs, detent elements and/or slide tracks for the elements of the associated sub-assembly.

It is possible to provide the confronting sides of the housings with openings for plug pins and male and female plugs for making electric line connections and to directly make such plug-and-socket points before the connection is effected by the connecting elements. At least one plug opening is provided in the side walls of the supplemental shell member and this plug opening permits the making of electric line connections.

Short line connections by means of cables can be established if the plug opening are provided in wall portions of the supplemental shell member which are beveled across its corners.

It will be particularly desirable to provide line cables which have female plugs for making the plug-and-socket joints and extend in the gaps between the housings and to provide covering elements which close the gaps to form cable ducts adapted to be secured to the shell walls by integrally formed detent and counterdetent elements so that such cables will be protected against falling out toward the rear side and against being damaged from the rear side.

For a protection against soiling or environmental influences, it is contemplated that for sub-assemblies which comprise keyboards, the frame opening is closed on the visible side of the modular element by a plastic film, which is adapted to be deformed for an actuation of the individual keys.

Empty keyboards, i.e., keys having no inscription or marking, may be used and/or the inscription and marking of the individual keys can be altered if an interposed film, which carries inscriptions and marking symbols relating to the functions of the individual keys, is replaceably provided between the covering film and the keyboard and the covering film is transparent.

BRIEF DESCRIPTION OF THE DRAWING

Further details and advantages of the invention will become apparent from the following description of now preferred embodiments thereof, taken in conjunction with the drawing, in which

FIG. 3 shows two joined simple modular elements viewed from the rear side when the housing shells have been removed;

FIG. 4 is a sectional view taken on line IV—IV of FIG. 3 and showing a modular element;

FIG. 5 is a side elevation showing a connecting element;

FIG. 6 is a sectional view taken on line VI—VI in FIG. 5;

FIG. 7 is an elevation from the inside showing a shell member which supplements the body of FIGS. 3 and 4 to form a closed housing; and FIG. 8 is a sectional view taken on line VIII—VIII in FIG. 7.

DESCRIPTION OF THE PREFERRED EMBODIMENTS

Figure 1:
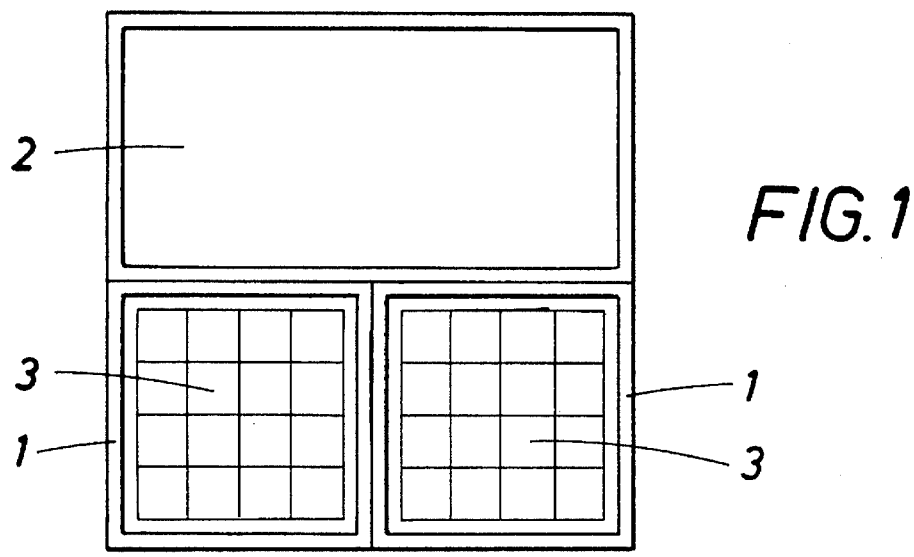
FIG. 1 shows a switchboard comprising three sub-assemblies including a display field and two keyboard sub-assemblies.

The switchboard shown in FIG. 1 is composed of three sub-assemblies, each of which comprises a modular element 1 or 2. The modular elements 1 have visible sides 3, which are constituted by keyboards and have a square contour. On the other hand, the modular element 2 has the contour of a rectangle whose size corresponds to two joined modular elements 1. While FIG. 1 shows the two modular elements 1 disposed below the modular element 2, they might also be arranged above the modular element 2 or one keyboard might be provided at the top and one keyboard underneath or the keyboards 3 might be mounted beside one narrow side of the modular element 2 or on the left and right of the modular element 2. In the illustrative embodiment, each keyboard 3 has sixteen individual keys. If fewer keys are required, only one modular element 1 provided with a keyboard 3 will be used and an empty element will be provided as a second modular element 1. It is also possible to replace individual rows or columns of the keyboards 3 by empty fields on the remaining visible side of the elements 1.

Figure 2:
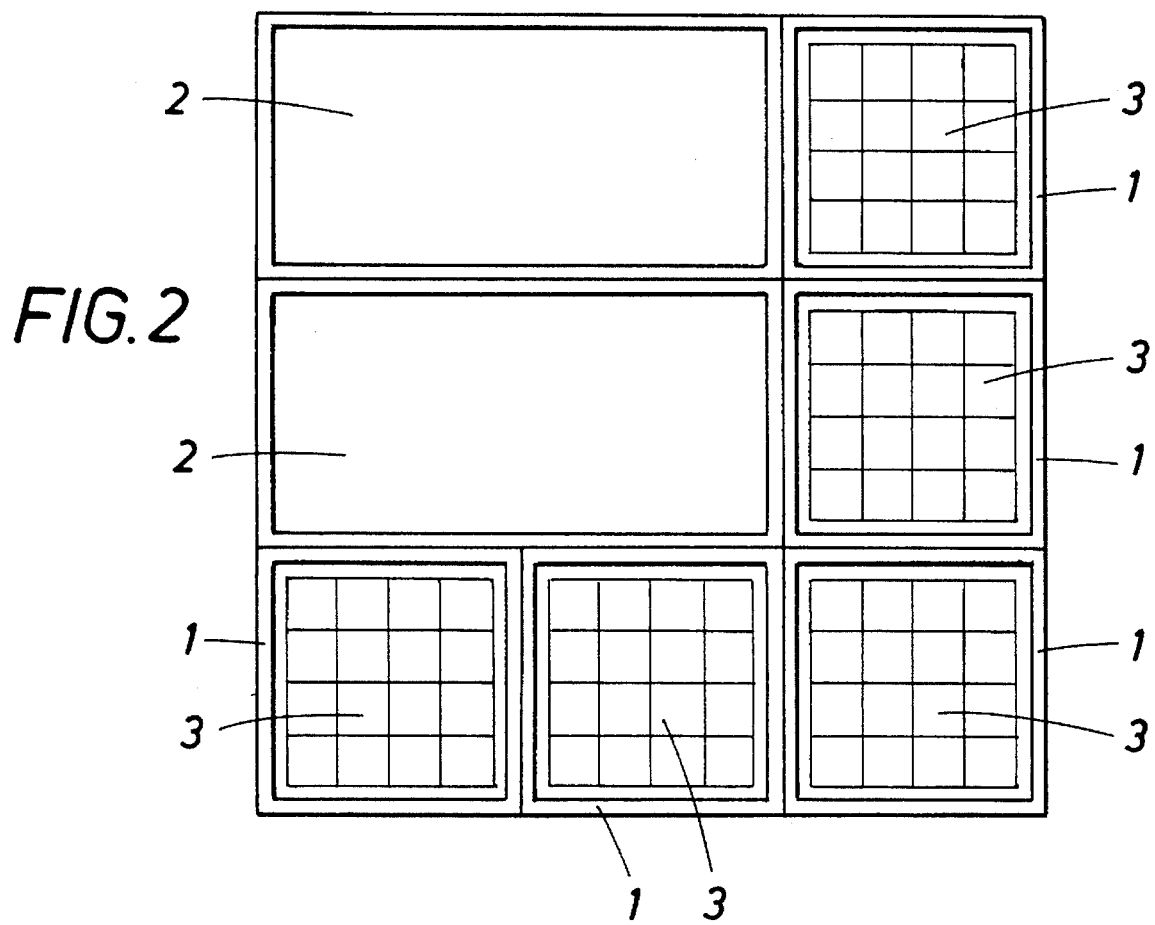
FIG. 2 shows a switchboard comprising two field sub-assemblies and four keyboard sub-assemblies.

FIG. 2 shows a different way in which modular elements 1, 2 can be combined. Larger modular elements may also be used, such as elements having the size of two basic elements. By a combination of larger elements 2, each of which consists of a multiple of the smaller elements 1 on their visible side, or of larger elements 1, it is possible to provide a larger board having a closed pattern having the desired width and height. In that case, individual fields or entire sections of the board may be constituted by empty elements.

FIGS. 3 and 4 show that each modular element 1 has on its visible side a frame 4 from which walls 5 protrude on the side which faces away from the visible side and together with the frame 4 constitute a half-shell. Protruding edge portions 6 of the frame are provided at their outer edges with groove-tongue profiles 7, 8 so that each frame can be joined to the frames of adjacent elements 1 and/or 2 without a gap. In the illustrative embodiment, the modular element 1 forms a keyboard 3 comprising individual keys, the frame opening is covered by an elastically deformable, transparent plastic film 9 and another plastic film 10 is disposed under the film 9 and carries designations or symbols which are associated with the individual keys of the keyboard 3 and indicate the functions of the individual keys. At least a major part of the key elements are accommodated in the shell which consists of frame 4, plastic covering 9 and side walls 5.

Walls 5 are spaced from the outer edges of protruding frame portions 6 and are parallel thereto. Round socket sleeves 11 for receiving connection elements are formed in the frame corners, and oblique wall portions 12 at the corners merge into the walls 5 and are formed with undercut hook-shaped slide grooves 13, which extend over the height of the walls 5 and are open on the outside. If two elements 1 are joined, as is shown in FIG. 3, it will be possible to insert connecting elements 14 as shown in FIGS. 3, 5 and 6 into the gap which is defined by walls 5 of adjacent elements 1. The connecting elements comprise an insert member 15, which consists of a U-shaped spring element, and detent projections 16, which protrude from the legs of that spring element. The connecting elements can be inserted so that the U-shaped profile faces the rear surface of the visible side so that they positively urge the two elements against each other.

Inserted connecting elements 14 extend to the top edge portion of walls 5. The same arrangement of corners and slide grooves 13 is provided in the middle of the long sides of element 2 so that juxtaposed elements 1 can be joined to element 2.

As shown in FIGS. 7 and 8, a second half-shell 17 may be mounted adjacent walls 5 so that modular element 1 forms a closed housing. A corresponding shell may also be provided for modular element 2. Shell 17 comprises side walls 18, which have thinner end portions 19, which extend into offset edge portions 20 of walls 5 (FIGS. 3 and 4). Outwardly extending hooks 21 rise from the bottom of shell member 17 and are parallel to two opposite walls 18. When the shell is assembled, these hooks snap into associated openings in walls 5 to join the two half-shells in contact with each other. Upright fingers 22 and supporting extension 23 serve to support and lock a carrying plate for the individual keys of the keyboard and optionally an additional printed circuit board (not shown in the drawing), which is to be accommodated in the housing part 17 to provide additional line connections.

Corners 24 of shell 17 are beveled approximately in conformity to the internal contour of corners 12 so that slide grooves 13 remain accessible and insert members 14 can be inserted and removed also when half-shells 17 are in position. Beveled corners 24 are adjoined on three sides by wall portions 25, which rise to one-half of the height of shell members 17. A cover plate 26 is provided on the fourth side from which the side wall rises at a small distance from the shell opening. It is possible to provide plug sockets on this side, which extend through openings 27 out of half-shell 17, and the opening of the plug socket is preferably disposed at a wall element 28.

When the devices are mounted, it is possible to establish line connections between elements 1 and 2 by means of plugs, which are inserted into the sockets extending through openings 27, and cables, which are connected to these plugs and installed in the gaps between walls 18. To form cable ducts, these gaps may be covered by trough-shaped covering elements, which extend at least over the length of walls 18 and have claws which enter detent openings of walls 18.

We claim:

1. A switchboard for an electric monitoring and control system, comprised of
   (a) at least two modular elements, the modular elements having visible sides of the same regular contour or of a multiple of said regular contour, the visible sides of the modular elements abutting each other to form a continuous pattern constituting a visible side of the switchboard, and each modular element comprising
      (1) a surface element forming the visible side and
      (2) side walls projecting backwards from the surface element, the surface element having edge portions projecting outwards of the side wall and forming a peripheral region,
      (3) the edge portions having outer edges with mating tongue and groove profiles whereby abutting surface elements of the modular elements may be plugged together while leaving gaps between adjacent ones of the side walls below the projecting edge portions, and
      (4) the side walls being formed with undercut locking grooves, and
   (b) connecting elements inserted in the gaps between the adjacent side walls and having
      (1) detent projections engaging the locking grooves, the detent projections being arranged at respective ends of the connecting elements and having hooked arms extending from the connecting element ends.

2. The switchboard or display board of claim 1, wherein the side walls are disposed parallel to, and at a distance from, the outer edges.

3. The switchboard of claim 1, wherein the connecting elements are elongated members whose length corresponds substantially to that of the gaps and whose cross-section corresponds substantially to that of the gaps, the undercut locking grooves facing the gaps.

4. The switchboard of claim 1, wherein the detent projections have a hooked cross-sectional shape.

5. The switchboard of claim 1, wherein the connecting elements are substantially U-shaped spring members having two legs defining a space therebetween, the legs bearing against the adjacent side walls and carrying the detent projections.

6. A switchboard for an electric monitoring and control system, comprised of (a) at least two modular elements, the modular elements having visible sides of the same regular contour or of a multiple of said regular contour, the visible sides of the modular elements abutting each other to form a continuous pattern constituting a visible side of the switchboard, and each modular element comprising (1) a surface element forming the visible side and (2) side walls projecting backwards from the surface element, the surface element having edge portions projecting outwards of the side wall and forming a peripheral region, the surface element comprising a frame of regular contour and a transparent film spread over the frame, and the surface element and the side walls forming a half-shell open towards a rear of the modular element facing away from the visible side, (3) the edge portions having outer edges with mating tongue and groove profiles whereby abutting surface elements of the modular elements may be plugged together while leaving gaps between adjacent ones of the side walls below the projecting edge portions, and (4) the side walls being formed with undercut locking grooves, and (b) connecting elements inserted in the gaps between the adjacent side walls and having (1) detent projections engaging the locking grooves.

7. The switchboard of claim 6, wherein the modular element further comprises another half-shell open towards the visible side and detent members projecting from the other half-shell and engaging openings in the side walls for attaching the other half-shell to the side walls, the half-shells forming a casing, and the other half-shell having a contour exposing the undercut locking grooves to access by the detent projections of the connecting elements.

8. The switchboard of claim 7, wherein the other half-shell has side walls having at least one opening receiving a socket for a plug providing an electric cable connection.

9. The switchboard of claim 8, wherein the side walls having the opening are arranged at corners of the frame and extend at an angle to the frame across the corners.

* * * * *